United States Patent [19]

Yamauchi

[11] Patent Number: 4,955,050
[45] Date of Patent: Sep. 4, 1990

[54] SYSTEM CONFIGURATION OF WIRELESS PBX AND COMMUNICATION METHOD THEREFOR

[75] Inventor: Yukiji Yamauchi, Kokubunji, Japan
[73] Assignee: Hitachi, Ltd., Tokyo, Japan
[21] Appl. No.: 331,298
[22] Filed: Mar. 31, 1989

[30] Foreign Application Priority Data

Apr. 1, 1988 [JP] Japan .................................. 63-78008

[51] Int. Cl.⁵ .............................................. H04Q 7/04
[52] U.S. Cl. ...................................... 379/59; 455/33; 379/63
[58] Field of Search ...................... 379/58, 59, 60, 63; 455/33

[56] References Cited

U.S. PATENT DOCUMENTS

| | | | |
|---|---|---|---|
| 4,658,416 | 4/1987 | Tanaka | 379/59 X |
| 4,771,448 | 9/1988 | Koohgoli et al. | 379/63 X |
| 4,843,622 | 6/1989 | Yotsutani et al. | 379/63 X |

OTHER PUBLICATIONS

"System Configuration of Multi-Zone Cordless Telephone", Nation Conference Record, 1986, The Institute of Electronics and Communication Engineers of Japan, pp. 2-256.

Tobagi, F. A., "Modeling and Performance Networks Proceedings of the IEEE", vol. 75, No. 1, pp. 135-155.

Primary Examiner—James L. Dwyer
Attorney, Agent, or Firm—Antonelli, Terry, Stout & Kraus

[57] ABSTRACT

A system configuration of wireless PBX (Private Branch Exchange) and communication method therefor with high user facility. In the system configuration of wireless PBX and communication method therefor, a specified telephone number is assigned to each portable radio telephone and also to each radio base station disposed at a predetermined area interval. Not only a person can issue a call by designating another subscriber to a portable radio telephone, but also the person can call an arbitrary subscriber to a portable radio telephone present near at an arbitrary radio base station.

8 Claims, 10 Drawing Sheets

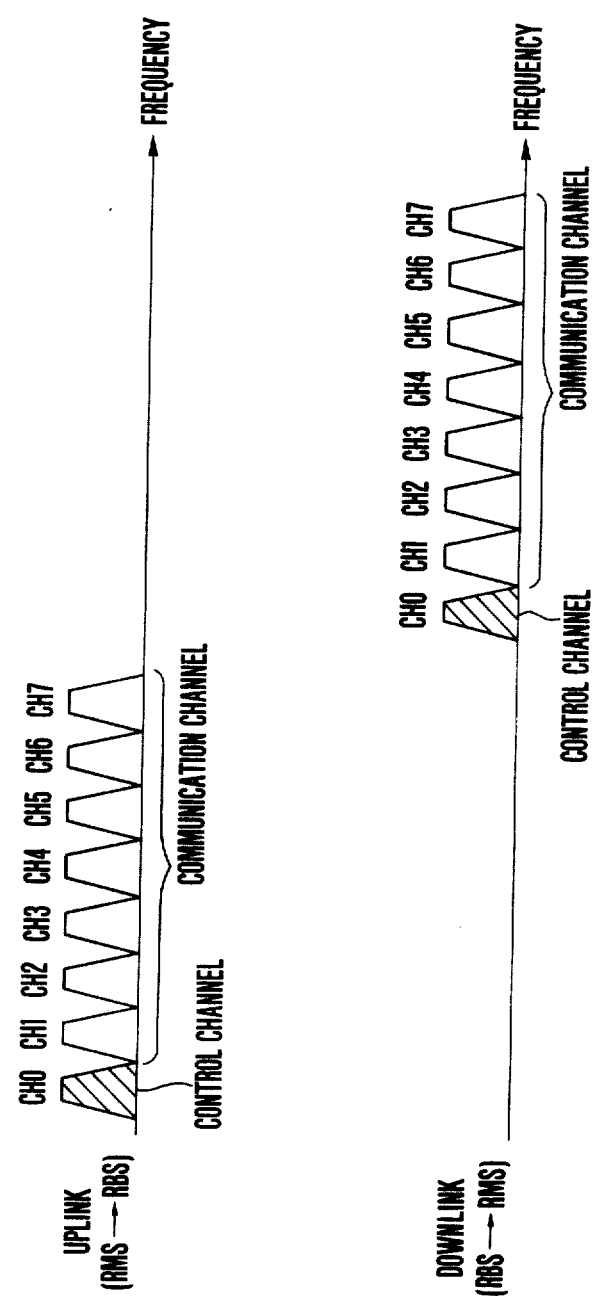

FIG. 7

| RBS ID | ID's OF NEIGHBORING RBS |
|---|---|
| 201 | 202, 203 |
| 202 | 201, 203 |
| 203 | 201, 202 |
| 204 | 205 |
| 205 | 204 |
| 206 | |

FIG. 6

| RMS ID | RBS ID |
|---|---|
| 301 | 204 |
| 302 | 204 |
| 303 | 205 |
| 304 | 202 |
| 305 | 202 |
| 306 | 204 |
| 307 | 205 |
| 308 | 203 |
| 309 | 205 |
| 310 | 202 |

FIG.9

| RBS ID | RMS SELECTION CANDIDATES | | | | |
|---|---|---|---|---|---|
| | PRIORITY 1 (HIGHEST PRIORITY) | PRIORITY 2 | PRIORITY 3 | PRIORITY 4 | PRIORITY 5 |
| 201 | 302 | 305 | 309 | 304 | 308 |
| 202 | 303 | 307 | 302 | 305 | 309 |
| 203 | 304 | 308 | 303 | 307 | 302 |
| 204 | 307 | 306 | 301 | | |
| 205 | 301 | 306 | 307 | | |
| 206 | 310 | | | | |

117

SYSTEM CONFIGURATION OF WIRELESS PBX AND COMMUNICATION METHOD THEREFOR

BACKGROUND OF THE INVENTION

1. Field of the Invention

The present invention relates to a system configuration of wireless PBX (private branch exchange), and more particularly to a system configuration of wireless PBX using cordless phones suitable for use within the premises of a building or the like which contains a plurality of various rooms each occupying a specific area.

2. Description of the Prior Art

As radio communication technique has developed in recent years, a system using portable telephones such as cordless phones and car telephones is now of practical use. Workers within the premises of buildings, factories and the like often leave their seats, so that conventional wire telephones may sometimes become useless in giving messages to such persons. Accordingly there are much demands for a system wherein extension telephones within the premises are made cordless, and a user carries a cordless phone with him or her so that telephone communications are allowed wherever he or she is within the premises.

An example of multi-zone cordless phones for such a system on the distributed control basis is shown in a report entitled "SYSTEM CONFIGURATION OF MULTI-ZONE CORDLESS TELEPHONE", National Conference Record, 1986, Communications, The Institute of Electronics and Communication Engineers of Japan, at page 2-256. With the cordless telephone system presented in this document, it can be well anticipated that every person is provided with a portable radio mobile station and wired extension telephones commonly present at an office or the like will eventually disappear.

If each person is provided with a wireless telephone, a particular person can be called easily. However, it becomes very difficult to call an unspecified person in a particular location. The situation of "Calling an unspecified person in a particular location" is, for example, a situation where a certain person present at the meeting in an arbitrary meeting room wishes to ask an unspecified person in the room to do something. In such a situation, the person at the meeting does not known who is present in the room. Therefore, the person at the meeting is forced to call persons who, the person at the meeting considers, will probably be present in the room, on the trial and error base, or carry out other measures.

SUMMARY OF THE INVENTION

It is an object of the present invention to provide a system configuration of wireless PBX capable of calling a particular person, and in addition capable of calling an unspecified person present at a particular location.

To achieve the above object, according to the system configuration of wireless PBX of this invention, an identification number is specifically assigned to each portable radio mobile station and to each radio base station which is connectable to portable radio mobile stations through radio channels for linking communications among the portable radio mobile stations. Each radio mobile station generates a signal containing its own first identification number at a predetermined time interval, and each radio base station forms packets by using the first identification number and its own second identification number to send the packets to a private branch exchange. The private branch exchange causes the first and second identification numbers within the packets received from the radio base station to be stored in a memory while retaining a correspondence between the first and second identification numbers.

If a user or subscriber having a first radio mobile station requests communications by designating a second mobile station, the private branch exchange which received the request via an arbitrary radio base station refers to the memory and causes the first radio mobile station to be connected to the second radio mobile station via a radio base station associated with the second radio mobile station.

If the user or subscriber having the first radio mobile station requests communications by designating a second base station, the private branch exchange refers to the memory and causes the first radio mobile station to be connected to an arbitrary or predetermined radio mobile station associated with the second radio base station.

According to the system configuration of wireless PBX of this invention, a user can selectively use either the mode for designating the telephone number of a radio mobile station or the mode for designating the telephone number of a radio base station. Therefore, the system configuration of wireless PBX allows a call to a particular person, and in addition allows a call to an unspecified person present at a particular location, thus contributing to user facility. According to a preferred embodiment, the ringing sound for a call request signal is made discriminable between a telephone number of a radio mobile station and a telephone number of a radio base station. Therefore, a user can discriminated if the ringing sound is for the user or for an arbitrary person, thus contributing to user facility.

The foregoing and other objects, advantages, manner of operation, and novel feature of the present invention will be understood from the following detailed description when read in connection with the accompanying drawings.

BRIEF DESCRIPTION OF THE DRAWINGS

FIG. 4 shows the arrangement of radio channels used by a radio mobile station and a radio base station according to the present invention;

FIG. 6 shows the memory map of a radio mobile station location memory within the private branch according to the present invention;

FIG. 7 shows the memory map of a radio base station location memory within the private branch exchange according to the present invention;

FIG. 9 shows the arrangement of a paging order memory within the private branch exchange according to the present invention.

DESCRIPTION OF THE PREFERRED EMBODIMENTS

Figure 1:
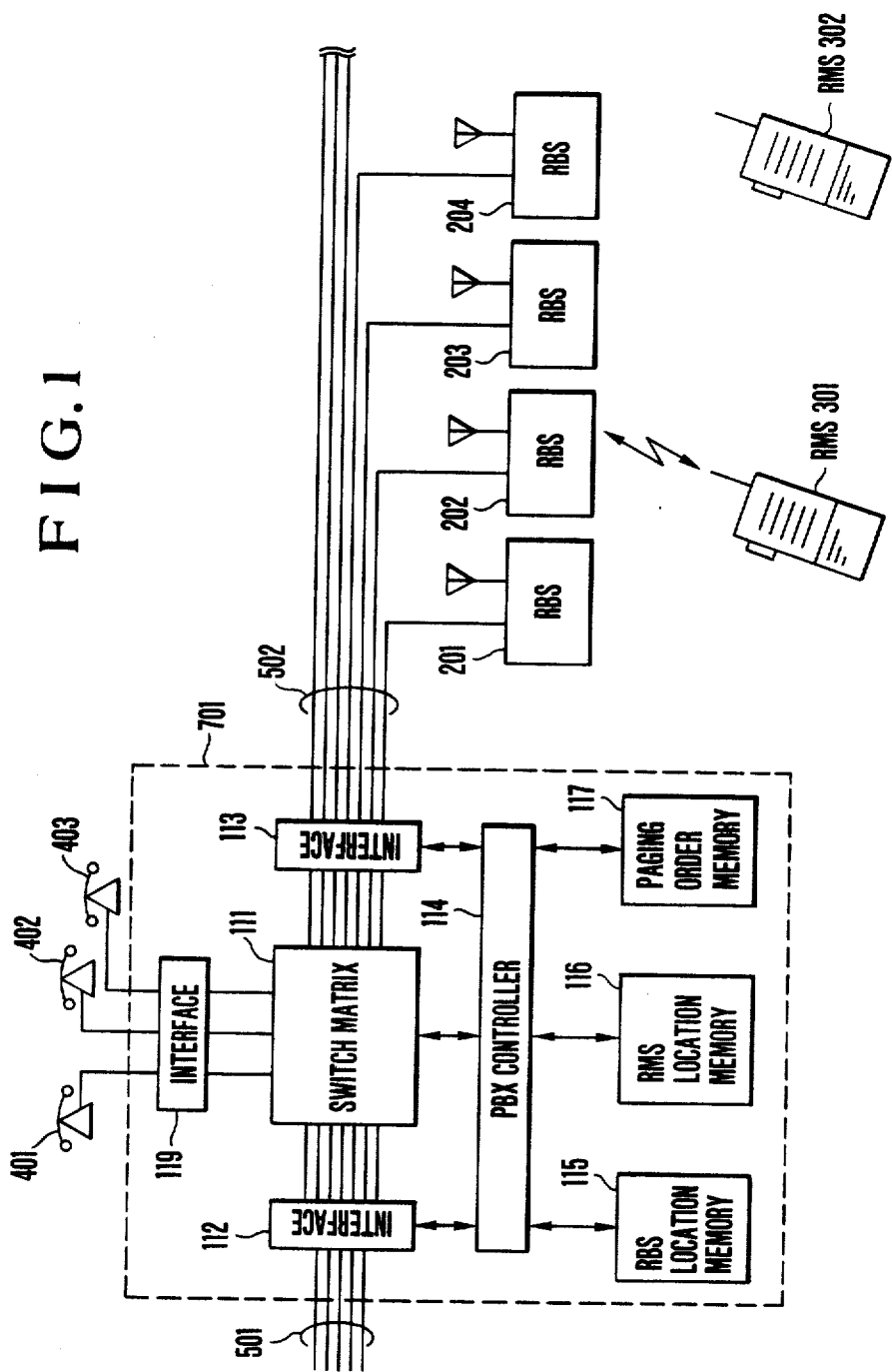
FIG. 1 is a block diagram showing the outline of a system configuration of wireless PBX according to the present invention.

FIG. 1 is a block diagram showing the outline of the system configuration of wireless PBX according to the present invention;

Referring to FIG. 1, a private branch exchange (hereinafter abbreviated as PBX) 101 installed within the premises of buildings or the like is connected to a plurality of radio base stations (hereinafter abbreviated as RBS) via wire lines.

Each of a plurality of radio mobile stations (hereinafter abbreviated as RMS) 301, 302 communicates with one of RBSs near the RMS. For the purpose of simplicity, only a small number of RBSs and RMSs are shown in the drawing. However, in practice, one or several RBSs 201 to 204 are installed within each room of a building depending upon traffic amount. Each RBS has a single pair of telephone lines. However, a plurality of pairs may be assigned to each RBS depending on traffic amount.

An RMS is generally held by all subscribers so that the total number may become several tens to several thousands depending on the system scale.

Figure 2:
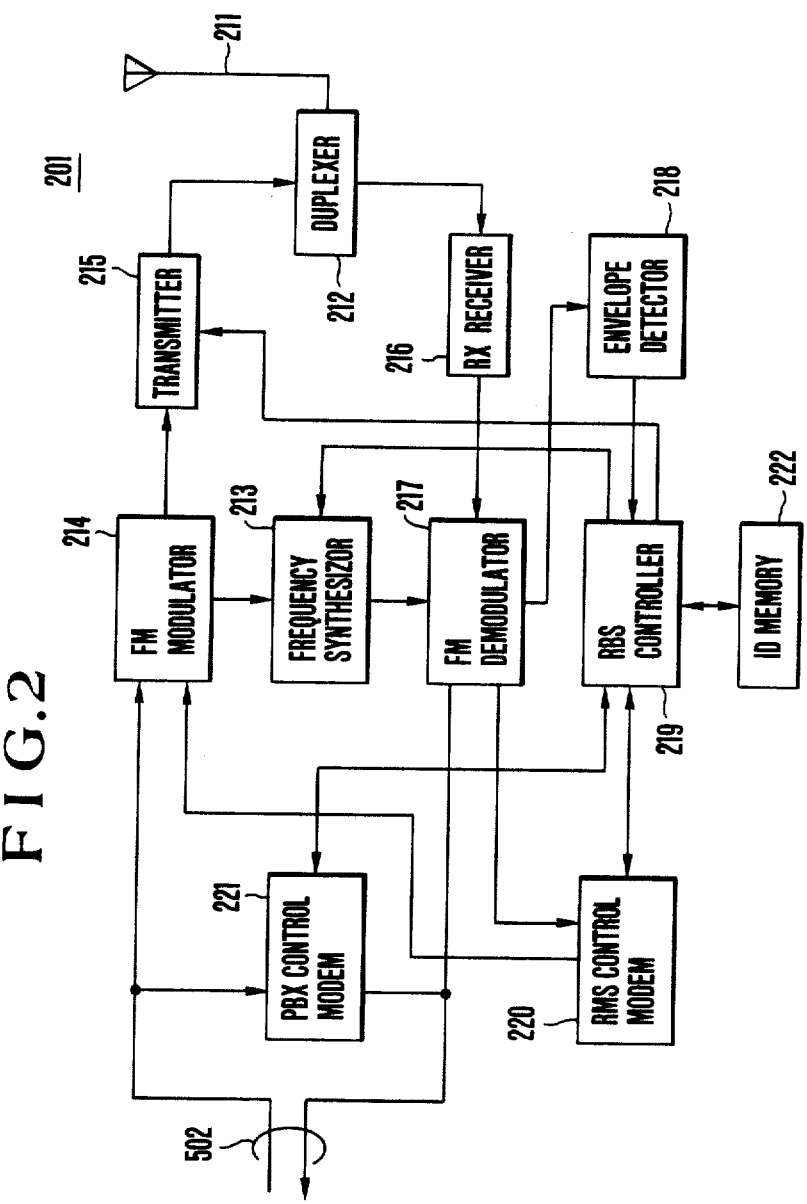
FIG. 2 is a block diagram showing the structural outline of a radio base station according to the present invention.

FIG. 2 is a block diagram showing the structural outline of an RBS according to the present invention.

An RBS includes an antenna 211 for radio communication with RMSs, duplexer 212, frequency synthesizer 213, FM modulator 214, transmitter 215, receiver 216, FM demodulator 217, envelope detector 218 for measuring the strength of a received signal, RBS controller 219 for controlling respective circuit elements, RMS control modem 220, PBX control modem 221, and ID memory 222 for storing an identification number ID of the RBS now concerned.

When an RBS receives a signal carrying an ID signal to be described later with reference to FIG. 5A, the received signal is amplified by the RX receiver 216 and demodulated by the FM demodulator 217. Then, the ID signal is applied through the RMS control modem 220 to the RBS controller 219. The strength of the ID signal is measured at the envelope detector 218. Then, a location registration request frame 50B to be described later with reference to FIG. 5B is generated by the RBS controller 219, the frame including the RMS identification number contained in the received ID signal, the strength of the ID signal, and an identification number previously assigned to the RBS now concerned and stored in the memory 222. The frame 50B is then sent to the PBX 101 via the PBX control modem 221.

Figure 3:
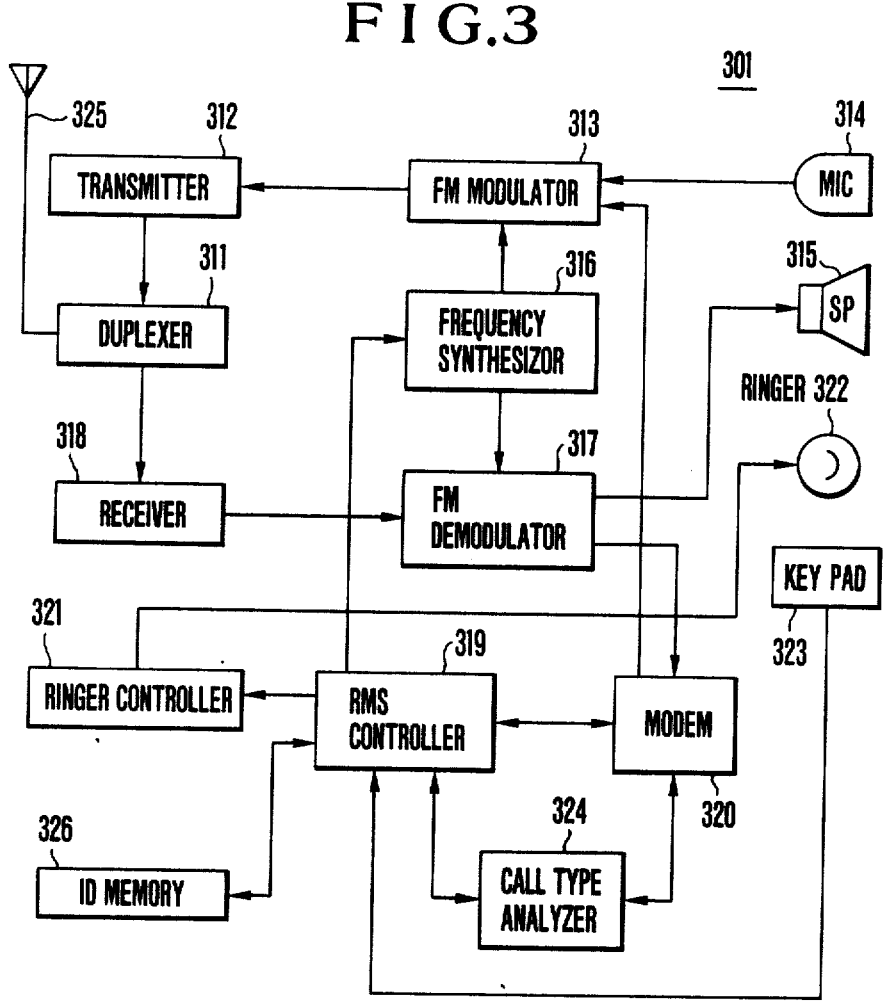
FIG. 3 is a block diagram showing the structural outline of a radio mobile station according to the present invention.

FIG. 3 is a block diagram showing the structural outline of an RMS according to the present invention.

An RMS is constructed of a duplexer 311, transmitter 312, FM modulator 313, microphone (MIC) 314, speaker (SP) 315, frequency synthesizer 316, FM demodulator 317, FM receiver 318, RMS controller 319 for controlling respective circuit elements, modem 320 for transmitting an ID signal to be described later, ringer controller 321 for control of the tone of a ringing sound in accordance with a paging type identifier (described later) contained in a call signal, ringer 322, key pad 323 for input of a telephone number (identification number) of a terminating station, call type analyzer 324 for analyzing the paging type identifier contained in a call signal, antenna 325 for radio communications with RBSs, and ID memory for storing an identification number previously assigned to the RMS now concerned.

When a user of an RMS issues a call while designating a destination or terminating station by using the key pad 323, the RMS controller 319 causes the oscillation frequency of the frequency synthesizer 316 to be set at a control channel later described with reference to FIG. 4, and generates a call request signal later described with reference to FIG. 5C to send it to the modem 320. The call request signal is modulated into an audio signal at the modem 320 and thereafter, further modulated into a radio frequency at the FM modulator and amplified at a transmitter 312 to be transmitted out via the duplexer 311. Alternatively, an incoming call signal is separated at the duplexer 311, amplified at the receiver 318 and thereafter, an audio signal is reproduced at the FM demodulator 317. If the reproduced audio signal is a control signal, it is then demodulated and supplied to the RMS controller 319. If the reproduced audio signal is not the control signal but another signal, it is then supplied to the speaker 315 to drive it. The received control signal is also supplied from the modem 320 to the call type analyzer 324. If the received control signal is a call signal destinated to the RMS now concerned, the call type analyzer 324 discriminates the call type, i.e., discriminates if the call is a direct designation of the RMS or if the call has been acknowledged by a specific RBS on which the location of the RMS now concerned has been registered. The discrimination result is sent to the RMS controller 319 which controls the ringer controller 321 in accordance with the discrimination result. The ringer controller 321 selects one of a plurality of ringing sound tones.

FIG. 4 shows an example of frequency division multiplexing of communications between RBSs and RMSs. The system uses communication channels Ch1, . . . , Ch7 for transmission of speechs and a control channel Ch0 for transmission of a control signal for incoming calls, outgoing calls, location registration and the like. Many communication channels are provided with different frequencies, and the RBSs or RMSs which are positioned near to each other use different channels except for the control channel which is common to all the RBSs and RMSs, in order to avoid radio interference among the subscribers. Each RBS accordingly sequentially monitors communication channels to search a not-busy or idle channel, during the time when speechs are not conducted. In order to realize a full duplex communication, the uplink and downlink are assigned with different frequency channels as shown in FIG. 4 so that one communication channel is assigned to each of uplink and downlink in each call.

Since the same control channel Ch0 is shared by all the RBSs and RMSs, the control signal in the control channel for controlling incoming calls, outgoing calls, location registration and the like is transmitted in packets using the Slotted ALOHA (Additive Links On line Hawai Area) protocol which is well known in the art, e.g., in the document by Tobagi, F. A.: "Modeling and Performance Analysis of Multihop Packet Radio Networks", Proc. IEEE, Vol. 75, No. 1, pp. 135 to 155 (Jan. 1987). There is a possibility of contention of control signals among a plurality of stations on the control channel. However, this can be solved through the retransmission procedure between RBSs and RMSs.

Each RMS watches the control channel during its stand-by state, i.e., during a non-speech state, to wait for its specified control signal. In addition, each RMS transmits automatically or manually, at predetermined time intervals of, e.g., several minutes, a short control signal (hereinafter abbreviated an ID signal) containing its specified identification number, onto the control channel. An example of the ID signal format is shown in FIG. 5A.

Figure 5A:
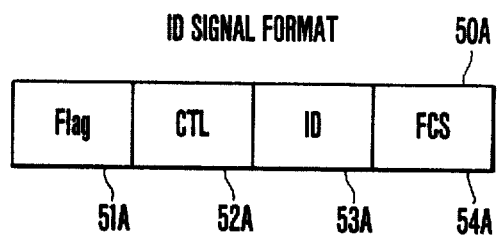
FIG. 5A shows the format of an ID (identification) signal generated by a radio mobile station according to the present invention.
Figure 5B:
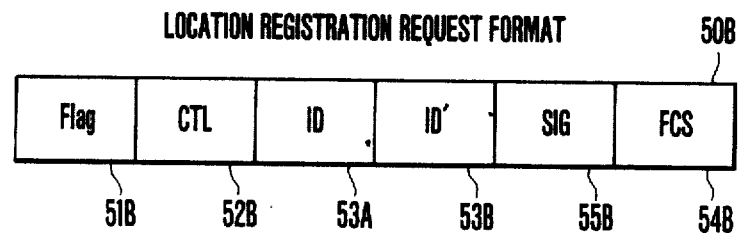
FIG. 5B shows the format of a location registration request signal generated by a radio base station according to the present invention.
Figure 5C:
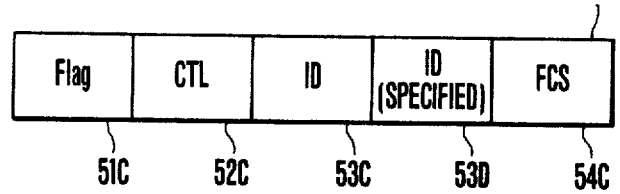
FIG. 5C shows the format of a call signal generated by a radio base station according to the present invention.

As shown in FIG. 5A, a frame 50A is composed of a flag 51A field for storing a bit synchronization pattern, CTL (control) 52A field for storing a frame identifier, ID 53A for storing an identification number of an RMS, and FCS 54A field for storing a frame check sequence.

At each RBS while no communication is conducted with any RMS, the RBS controller 219 causes the frequency synthesizer 213 to tune in the control channel frequency. The receiver 218 and FM demodulator 217 wait for a reception of the ID signal.

With the above ID signal wait procedure, it is possible for an RBS to successfully receive the ID signal when it is transmitted from an RMS.

FIG. 5B shows an example of a location registration request (signal) format previously mentioned as the frame 50B.

The frame 50B is composed of a flag 51B field for storing a bit synchronization pattern, CTL for storing a frame identifier representative of a frame type, ID 53A field for storing an identification number of an RMS, ID' 53B field for storing an identification number of an RBS, SIG 55B field for storing the strength of a received signal (ID signal), and FCS 54B field for storing a frame check sequence.

PBX 101 has an interface 113 for interconnection between wire lines 502 and PBX 101, an interface 112 for interconnection between PBX 101 and wire lines 501 from another PBX, a switch matrix 111 for performing circuit switching under control of a PBX controller 114 and RBS location memory 115 RMS location memory, and paging order memory 117 used by the PBX controller 114 for control of the switch matrix 111.

When a location registration request signal is transmitted onto the wire line 502, PBX 101 receives it via the interface 113 and sends it to the PBX controller 114. The PBX controller 114 uses the received signal as RMS location registration information and stores, in the RMS location memory 116, information indicating the correspondency between the RMS and RBS identification numbers, that is which RMS belongs to which RBS. FIG. 6 shows an example of the RMS location memory map for the system composed of ten RMSs and five RBSs.

In the operation of registering a present location of each RMS in PBX in accordance with the above-described procedure, the ID signal transmitted from an RMS may sometimes by received by a plurality of RBSs. In such a case, the plurality of RBSs transmit the location registration request signals associated with the same RMS to PBX 111. The PBX controller 114 then checks the location registration request signals based on the strengths of respective ID signals, and selects one of the RBSs which has the strongest ID signal level to register the location of the RMS in correspondence with the selected RBS.

The above operation is carried out periodically and continuously at predetermined time intervals of about several minutes while no speech communication is conducted between RMSs and RBSs. Therefore, the contents of the RMS location memory 116 at PBX 101 are always updated.

Figure 8A:
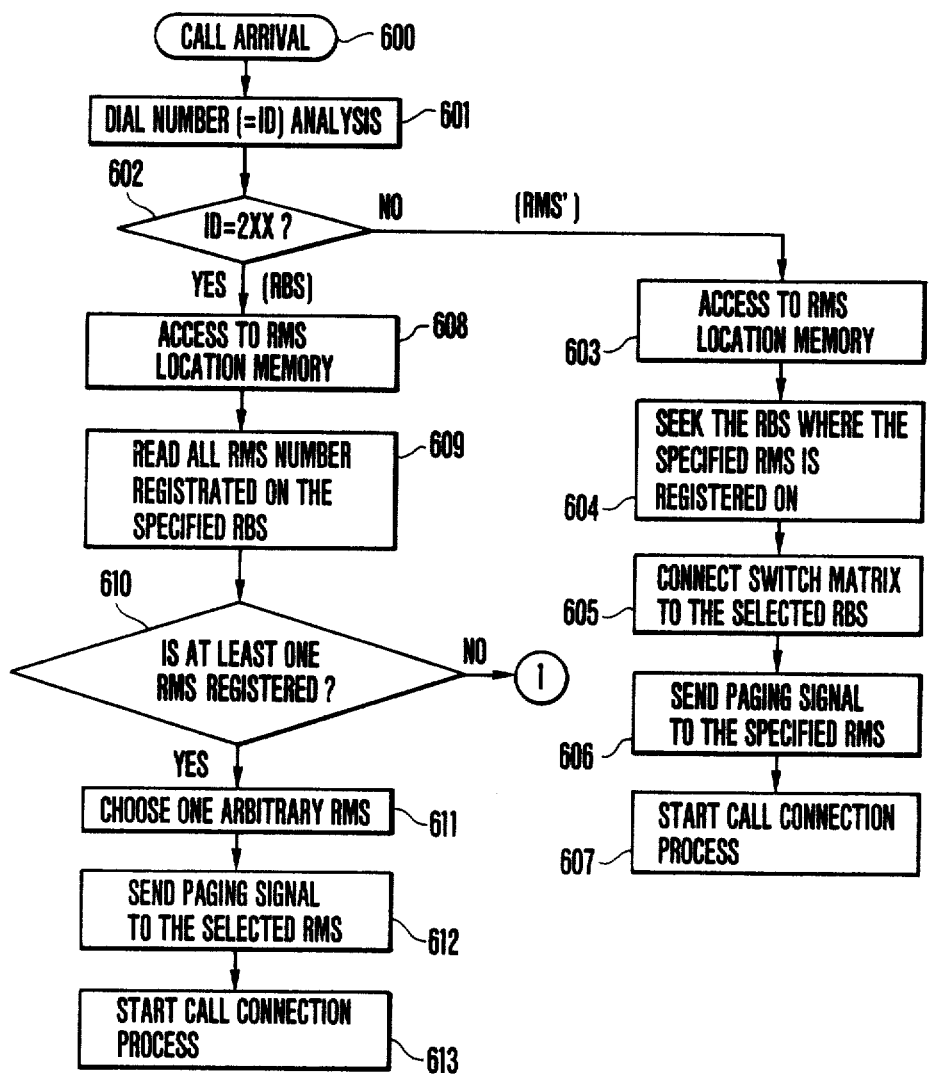
FIGS. 8A and 8B are flow charts showing the call procedure in the system configuration of wireless PBX according to the present invention.
Figure 8B:
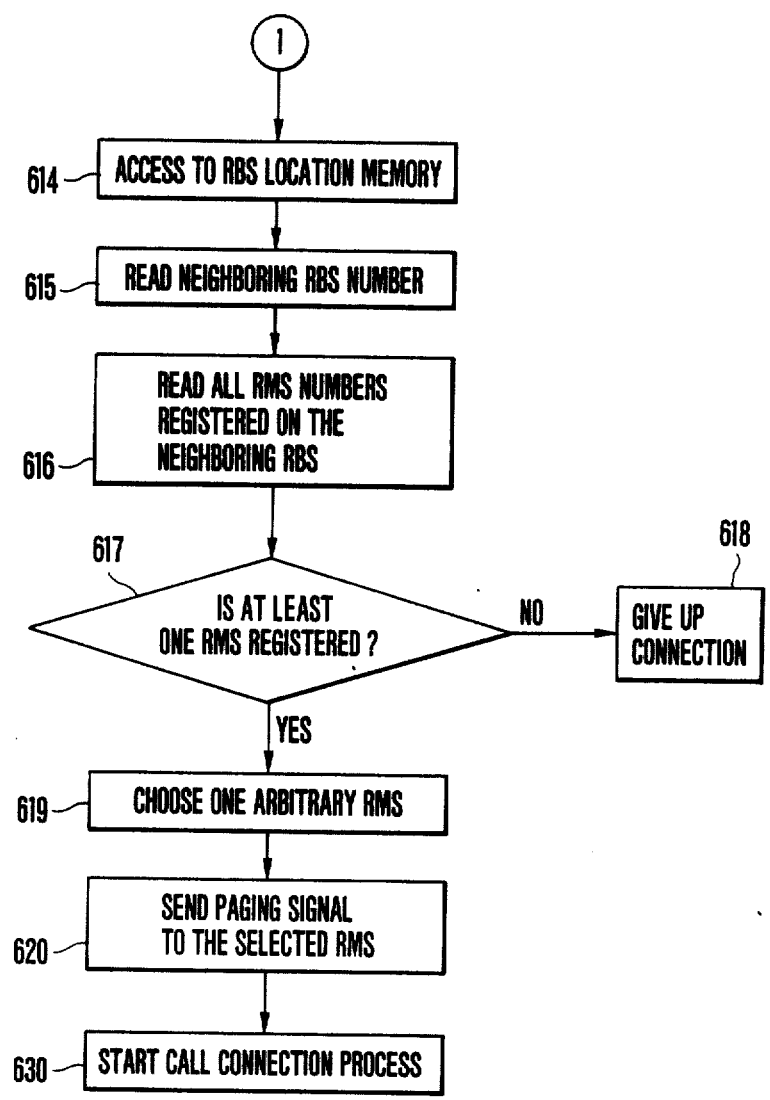

Next, the operation of calling an RMS from another RMS will be described with reference to the flow chart shown in FIGS. 8A and 8B.

First, the call procedure for a specified subscriber will be described. Upon occurrence of a call request signal from the wire line 501 from another PBX, wire telephone 401 to 403 or arbitrary RMS, the PBX controller 114 at PBX 101 detects the call and analyzes the dial number of the call terminating station (step 601).

The call signal is generated by an RBS which received a call request signal from an RMS. The call signal has a frame format shown in FIG. 5C.

A frame 50C of the call signal is composed of a flag 51C field, CTL 52C field, ID 53C field for storing the identification number of a call originating RMS or wire telephone 401 to 403, ID 53D field for storing the identification number of a call terminating RMS, RBS or wire telephone, and FCS 54C field. The flag 51C field and FCS 54C field are the same as those shown in FIGS. 5A and 5B. The CTL 52C field stores therein a code representative of a call signal. The call request signal from an RMS has the same format as that of the frame 50C, so the description therefor is omitted.

In this embodiment, the identification number of each RMS is a number of three figures starting from 300's, whereas the identification number of each RBS is a number of three figures starting from 200's.

When a call designates a specified RMS, the caller dials the identification number (telephone number) of the RMS. The PBX controller 114 recognizes, based upon the first number (i.e., "3" of 300's) of the telephone number registered on the frame 50C, that the call has designated a specified RMS (step 602). Then, the PBX controller 114 accesses the RMS location memory 116 (step 603), seeks the RBS where the specified RMS is registered on (step 604), and connects the switch matrix 111 to the selected RBS (step 605). Then, a control signal including the paging order signal is sent to the specified RMS (step 606) to start a call connection process (step 607).

Next, the call procedure will be described, where a caller designates a particular RBS and calls an arbitrary RMS registered on the RBS. In this case, the caller dials the identification number of the designating RBS to be designated, i.e., a three figure number starting from 200's. The PBX controller 114 recognizes, based on the first number (i.e., "2" of 200's) of the telephone number, that the call has designated a specified RBS (step 602).

In this case, the PBX controller 114 accesses the RMS location memory 116 (step 608), and reads all RMS identification numbers registered on the designated RBS (step 609). In the example of the contents of the RMS location memory 116 shown in FIG. 6, if an RBS having an identification number of 204 is designated, then the identification numbers of 301, 302, and 306 are read. The PBX controller 114 then chooses one arbitrary RMS from the read-out RMS identification numbers (step 611). This number may be the smallest identification number among the readout identification numbers, or the identification number having a highest paging order previously set (to be described later).

With the above operation, the identification number of an RMS to be actually called is determined every time an RBS designating call occurs. Therefore, similar to the case of calling the above-described specified RMS, the PBX controller 114 connects the switch matrix 111 to the designated RBS, and a control signal including the paging order signal is sent via the RBS to the specified RMS (step 612) to then start a call connection process (step 613). The call connection process between an RBS and RMS is carried out in a conventional manner, so the detailed description therefor is omitted.

In the above operations, if there is no RMS registered on the designated RBS upon occurrence of an RBS designating call (step 610), the PBX controller 114 checks if there is some RMS registered on a neighboring RBS near the designated RBS (step 616). If there is no RMS in any neighboring RMS, then it is determined that a call connection process is impossible and a busy tone is returned to the caller (step 618).

The RBS location memory 115 is provided at PBX 101 to check which RBS is a neighboring RBS near the call designated RBS. The positional relationship of RBSs is stored in the RBS location memory 115 beforehand through manual operation. As the positional relationship, the coordinate values of respective RBSs in the three-dimensional space may be used. However, as a simple alternative method, neighboring RBSs may be fixedly determined beforehand for each RBS.

FIG. 7 shows an example of the contents stored in the RBS location memory 115. As shown in FIG. 7, the number of neighboring RBSs may be 0, 1 or more. In the example shown in FIG. 7, six RBSs are connected to PBX 101.

By using the values shown in the RBS and RMS location memories 115 and 116, the operation of the PBX controller 114 upon occurrence of a call which designates RBS 201 will be described below.

First, the PBX controller 114 recognizes based on the dialed number 201 that the call has designated an arbitrary RMS registered on the RBS 201 (step 602). In accordance with the procedure described previously, the PBX controller 114 then accesses the RMS location memory 116 (step 608) to seek RMSs registered on the RBS 201 (step 609). In the example shown in FIG. 6, however, there is no RMS registered on the RBS 201. Therefore, the PBX controller 114 accesses the RBS location memory (step 614) to check the identification number of a neighboring RBS near the RBS 201 (step 615). In the example shown in FIG. 7, it can be seen that the neighboring RBSs have the identification numbers 202 and 203. Accordingly, the PBX controller 114 accesses again the RMS location memory 116 to seek the RMSs registered on the RBS 202 or 203 (step 616). In the example shown in FIG. 6, it can be seen that the RMSs have the identification numbers 304, 305, 308 and 310. One arbitrary RMS, e.g., RMS 304 is chosen from the RMSs 304, 305, 308 and 310 (step 618). Then, a call connection is effected via the RBS 202 where the RMS 304 is registered on (steps 620 and 621).

Upon occurrence of an RBS designating call in the above embodiment, if the designated RBS has a plurality of RMSs registered thereon, then there is a case where it is preferable not to chose an arbitrary RMS but to chose an RBS in the predefined priority or paging order.

To this end, the paging order memory 117 is provided at PBX 101, the priority order for respective RMSs being predefined and stored therein for each RBS.

Figure 10:
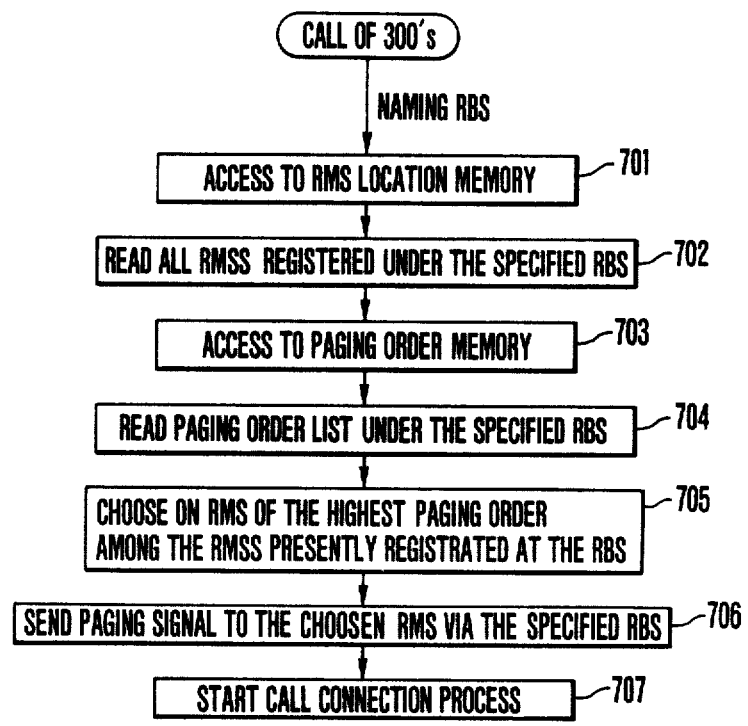
FIG. 10 is a flow chart showing another example of the call procedure in the system configuration of wireless PBX according to the present invention.

FIG. 9 shows an example of the contents of the paging order memory 117. In FIG. 9, the priority order is indicated as priority 1 to priority 5 with the higher priority having a smaller number. The flow chart illustrating the call procedure using the priority is shown in FIG. 10.

It is assumed that a call which designates RBS 204 has occurred under the state shown in FIGS. 6 and 9. In such a case, the PBX controller 114 accesses the RMS location memory 116 (step 701) to then recognizes that RMSs 301, 302 and 306 are being registered on the designated RBS (step 702). Next, the PBX controller 114 accesses the paging order memory 117 (step 703) to read the priority order or paging order list under the designated RBS (step 704). In the example shown in FIG. 9, the RBS 204 selects RMS 307, 306 and 301 in this order. Therefore, of the RMSs 301, 302 and 306 presently registered on the RBS 204, the RMS 306 having the highest priority order is chosen (step 705). The following operation is similar to steps 612 and 613 shown in FIG. 8A (steps 707, 707).

Use of the paging order memory 117 is advantageous in that if an RBS designating call occurs, a person not registered on the designated RBS is not given a call even if the person happens to be present near the designated RBS.

It is convenient for an RMS subscriber to be discriminable between an RMS designating call or an RBS designating call, based on the ringing sound at the terminating RMS side.

Figure 11:
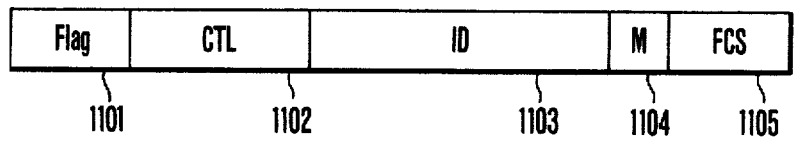
FIG. 11 shows the format of a call control signal.

To this end, upon occurrence of an RMS terminating call, PBX 101 sends a call control signal via an RBS to the RMS, the call control signal containing information bits representative of the call type. An example of the call control signal format is shown in FIG. 11. A frame 1100 of the call control signal is composed of a flag 1101 field, CTL 1102 field, ID 1103 field for storing the identification number of a terminating RMS, M 1104 field for storing a paging type identifier used in controlling a ringing sound, and FCS 1105 field.

The flag 1101, CTL 1102, ID 1103, and FCS 1105 have the same contents as those of the frames 50A and 50B described with FIGS. 5A and 5B.

Upon reception of the call control signal at an RMS side, the call type analyzer 324 checks the paging type identifier on the M 1104 field to change, in accordance with the contents of the paging type identifier, the tone, scale, singing pattern and the like of a ringing sound from the ringer 322 to thus inform the RMS subscriber of the call type. Instead of changing the ringing sound, a display device may be mounted on an RMS to display the call type thereon.

As appreciated from the foregoing detailed description of the system configuration of wireless PBX according to the present invention, both the call modes for designating a specified RMS and for designating an arbitrary RMS present at a specified RBS are provided. Therefore, it becomes possible to quickly give a necessary message or the like to a proper person.

We claim:

1. A system configuration of wireless PBX comprising:

a plurality of portable radio mobile means;

a plurality of radio base means connectable via radio channels to said portable radio mobile means for linking communications between said portable mobile means;

a private branch exchange connected via wire lines to said radio base means for supervising a relationship of interconnections among said portable radio mobile means;

each of said radio mobile means including means for generating a signal at a predetermined time interval, said signal containing a first identification number specifically assigned beforehand to each of said radio mobile means;

each of said radio base means including means for forming a packet upon reception of said signal and sending said packet to said private branch exchange, said packet being composed of said first identification number contained in said signal and a second identification number specifically assigned to each of said radio base means; and said private branch exchange including a first memory for storing said first and second identification numbers contained in said packet received from said radio base means, while retaining a correspondence between said first and second identification numbers;

wherein when a subscriber to a first radio mobile means requests a communication by designating a second radio mobile means, said private branch exchange refers to said first memory and connects said first radio mobile means to said second mobile means via a radio base means in correspondence with said second radio mobile means; and when said subscriber to said first radio mobile means requests a communication by designating an arbitrary radio base means, said private branch exchange refers to said first memory and connects said first radio mobile means to a specified radio mobile means in correspondence with said specified radio base means.

2. A system configuration according to claim 1, wherein said radio base means further includes means for measuring the strength of said signal received from said radio mobile means, said radio base means sending said packet with information representative of the strength of said signal being added thereto;

said private branch exchange further includes means for, when said private branch exchange receives a plurality of said packets each containing the same first identification number from a plurality of said radio base means, comparing the strengths of said signals on said received packets and selecting a packet which has the highest strength of said signal; and said first memory stores said first and second identification numbers on said selected packet while retaining a correspondence therebetween.

3. A system configuration according to claim 1, wherein said radio base means further includes means for measuring the strength of said signal received from said radio mobile means, said radio base means sending said packet with information representative of the strength of said signal being added thereto;

said private branch exchange further includes means for, when said private branch exchange receives a plurality of said packets each containing the same second identification number from a plurality of said radio base means, comparing the strengths of said signals contained in said received packets and assigning a priority order to said first identification number contained in each of said packets in accordance with the degree of said signal strength, and a second memory for storing said second identification number and said first identification number assigned with said priority order; and when said subscriber to said first radio mobile means requests a communication by designating an arbitrary radio base means, said private branch exchange refers to said second memory and connects said first radio mobile means to the radio mobile means having the highest priority order among said plurality of radio mobile means in correspondence with said designated radio base means.

4. A system configuration according to claim 1, wherein said private branch exchange includes a second memory for storing a positional relationship among said plurality of radio base means; and when said subscriber to said first radio mobile means requests a communication by designating said second mobile means, and if the result of reference to said first memory indicates that there is no registered radio base means corresponding to said second radio mobile means, said private branch exchange refers to said second memory and connects said first radio mobile means to said second radio mobile means via another radio base means having a predetermined positional relationship with said first-mentioned radio base means.

5. A system configuration according to claim 1, wherein said private branch exchange includes means for, when said subscriber to said first radio mobile means requests a communication, calling another subscriber to another radio mobile means by using a call signal, while adding a first code to said call signal when said first-mentioned subscriber requests a communication by designating said second radio mobile means, and a second code to said signal when said first-mentioned subscriber requests a communication by designating an arbitrary radio base means; and said radio mobile means includes means for discriminating, upon reception of said call signal, if said code contained in said call signal is said first code or second code, and means for changing a ringing sound in accordance with said discriminated code.

6. A communication method practiced in a system configuration of wireless PBX, the system including a plurality of portable radio mobile means; a plurality of radio base means connectable via radio channels to said portable radio mobile means for linking communications between said portable mobile means; and a private branch exchange connected via wire lines to said radio base means for supervising a relationship of interconnections among said portable radio mobile means; said communication method comprising the steps of:

causing each of said radio mobile means to generate a signal at a predetermined time interval, said signal containing a first identification number specifically assigned beforehand to each of said radio mobile means;

causing each of said radio base means to form a packet upon reception of said signal and send said packet to said private branch exchange, said packet being composed of said first identification number contained in said signal and a second identification number specifically assigned to each of said radio base means;

causing said private branch exchange to store in a first memory said first and second identification numbers contained in said packet received from said radio base means, while retaining a correspondence between said first and second identification numbers;

when a subscriber to a first radio mobile means requests a communication by designating a second radio mobile means, causing said private branch exchange to refer to said first memory and connect said first radio mobile means to said second mobile means via a radio base means in correspondence with said second radio mobile means; and when said subscriber to said first radio mobile means requests a communication by designating a specified radio base means, causing said private branch exchange to refer to said first memory and connect said first radio mobile means to a specified radio mobile means in correspondence with said specified radio base means.

7. A communication method according to claim 6, further comprising the steps of:

causing said radio base means to measure the strength of said signal received from said radio mobile means, and send said packet with information representative of the strength of said measured signal being added thereto;

causing said private branch exchange, when said private branch exchange receives a plurality of said packets each containing the same first identification number from a plurality of said radio base means, to compare the strengths of said signals on said received packets and select a packet which has the highest strength of said signal; and causing said first memory to store said first and second identification numbers on said selected packet while retaining a correspondence therebetween.

8. A communication method according to claim 6, further comprising the steps of:

causing said radio base means to measure the strength of said signal received from said radio mobile means, and send said packet with information representative of the strength of said measured signal being added thereto;

causing said private branch exchange, when said private branch exchange receives a plurality of said packets each containing the same second identification number from a plurality of said radio base means, to compare the strengths of said signals contained in said received packets and assign a priority order to said first identification number contained in each of said packets in accordance with the degree of said signal strength;

causing said private branch exchange to store in a second memory said second identification number and said first identification number assigned with said priority order;

when said subscriber to said first radio mobile means requests a communication by designating an arbitrary radio base means, causing said private branch exchange to refer to said second memory and select a radio mobile means having the highest priority order among said plurality of radio mobile means in correspondence with said designated radio base means; and connecting said first radio mobile station to said selected radio mobile means.

* * * * *